US006434455B1

(12) United States Patent
Snow et al.

(10) Patent No.: US 6,434,455 B1
(45) Date of Patent: Aug. 13, 2002

(54) VEHICLE COMPONENT DIAGNOSTIC AND UPDATE SYSTEM

(75) Inventors: Kevin D. Snow, Augusta; Matt W. Starks, Burlington; Steven L. Melvin, Scotts; Douglas C. Gooch, Richland; Edward Handley, Portage, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/369,629

(22) Filed: Aug. 6, 1999

(51) Int. Cl.[7] .............................................. G06F 19/00
(52) U.S. Cl. .............................. 701/33; 701/29; 701/35; 709/203
(58) Field of Search ......................... 701/29, 33, 32, 701/35; 709/101, 203, 213, 219

(56) References Cited

U.S. PATENT DOCUMENTS

| | | | | |
|---|---|---|---|---|
| 4,404,639 A | * | 9/1983 | McGuire et al. | 701/29 |
| 5,307,463 A | * | 4/1994 | Hyatt et al. | 395/275 |
| 5,435,212 A | | 7/1995 | Menig | 74/745 |
| 5,473,540 A | * | 12/1995 | Schmitz | 701/35 |
| 5,506,772 A | * | 4/1996 | Kubozono et al. | 701/29 |
| 5,555,498 A | * | 9/1996 | Berra et al. | 701/29 |
| 5,591,102 A | | 1/1997 | White et al. | 477/101 |
| 5,638,271 A | | 6/1997 | White et al. | 701/64 |
| 5,650,932 A | | 7/1997 | Chan et al. | 701/62 |
| 5,657,233 A | * | 8/1997 | Cherrington et al. | 701/29 |
| 5,729,454 A | | 3/1998 | Amsallen | 701/51 |
| 5,732,074 A | * | 3/1998 | Spaur et al. | 370/313 |
| 5,755,639 A | | 5/1998 | Genise et al. | 477/111 |
| 5,835,871 A | * | 11/1998 | Smith et al. | 701/29 |
| 5,884,073 A | | 3/1999 | Dent | 713/2 |
| 5,907,974 A | | 6/1999 | Stine | 74/473.21 |
| 5,916,286 A | * | 6/1999 | Seashore et al. | 701/29 |
| 5,946,972 A | | 9/1999 | Palmeri | 74/335 |
| 5,999,876 A | * | 12/1999 | Irons et al. | 701/115 |
| 6,006,146 A | * | 12/1999 | Usui et al. | 701/29 |
| 6,064,299 A | | 5/2000 | Lesesky et al. | 340/431 |
| 6,081,755 A | * | 7/2000 | Fujimoto | 701/1 |
| 6,104,988 A | * | 8/2000 | Klarer | 702/183 |
| 6,127,947 A | * | 10/2000 | Uchida et al. | 340/999 |
| 6,138,059 A | * | 10/2000 | Ozeki et al. | 701/1 |

FOREIGN PATENT DOCUMENTS

| | | |
|---|---|---|
| EP | 0671631 A2 | 9/1995 |
| EP | 1088706 A2 | 9/2000 |

* cited by examiner

Primary Examiner—Tan Nguyen
(74) Attorney, Agent, or Firm—Rader, Fishman & Grauer PLLC

(57) ABSTRACT

A logistic service system includes a programmable vehicle module, a service computer, a central server, a first data link connecting the module to the service computer and a second data link connecting the service computer to the central server. Component information retrieved from the module and stored on the server is used to service the module. The component may be subjected to diagnostics or updated with new parameters.

27 Claims, 3 Drawing Sheets

VEHICLE COMPONENT DIAGNOSTIC AND UPDATE SYSTEM

FIELD OF THE INVENTION

The present invention relates to the diagnosis and reconfiguration of a vehicle component module such as that associated with a heavy-duty automated transmission by means of a local computer in contact with a central server.

BACKGROUND OF THE INVENTION

Vehicle component modules associated with various vehicle components are well known. Such modules are programmed to the control vehicle components to which they are attached and to store component fault information known as fault codes. In turn, the modules are able to selectively communicate with an attached local computer that can retrieve the fault code information.

Unfortunately, only limited diagnostics are possible between the service computer and the module with which it communicates. A technician often retrieves a fault code and then manually tries to look it up in a troubleshooting guide or service manual. Even if successful, the steps taken by the technician are lost as soon as the process is completed and any other technician undertaking a similar diagnostic procedure in the future must recreate the diagnostic process.

Moreover, modules are not readily updated by a locally situated service computer lacking access to a central server. Bug fixes, and changes in component features are most often addressed through the installation of a whole new pre-programmed module by a technician rather than by updating the existing module. Such an approach is necessitated by a number of considerations. For example, so many parameters are generally available that a local computer is unable to store them. Additionally, some parameters are highly sensitive, and it would be inappropriate for them to be able to be installed on any possible component module. Further, once certain parameters are installed on a module, other parameters may be totally inappropriate, and a partial overwriting of previously installed parameters by a partially new set of parameters may undermine the module's programming and compromise the performance of the component itself.

SUMMARY OF THE INVENTION

The present invention is directed to a logistic service system comprising a re-programmable vehicle module, a service computer, and a central server. The service computer is connected to the module by means of a first data link and the service computer is in turn connected to the server by means of a second data link. Component information associated with the module is retrieved by the service computer and transmitted to the central server. The central server is able to use the component information to provide customized diagnostic scenarios that take into account characteristics of the module and its associated components. Thus, diagnostic servicing is greatly improved. In one aspect of the invention fault codes are used to provide customized debugging scenarios. In another aspect of the invention, a listing of all available symptoms is provided to a service technician and then a selection of the appropriate symptoms determines the debugging scenarios to be used.

Storing component information on the server also provides greatly improved component module updating. For example, the component information may be used to determine the available parameters to be downloaded to the module from a listing of all possible parameters. Moreover, if sensitive or private parameters are to be downloaded, the server can encrypt the parameters using the component information such that the module for which the parameters are intended can only decrypt the parameters. It is even possible to provide newly developed parameters in return for a payment without having to have the parameters downloaded to a new module and the module delivered directly to the vehicle service technician.

The inventive logistic service system provides a way to record successful diagnostic or updating procedures so that improved debugging or updating scenarios may be developed. If problems with a component are noted in the field, the problems can be quickly isolated and new updates or debugging scenarios made immediately available to all service technicians.

The invention even helps to track a vehicle component throughout its entire life even if it is used in different vehicles. Storing such historical information may provide appropriate debugging scenarios or component updates that would be impossible to determine strictly from a review of component information associated with the module.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
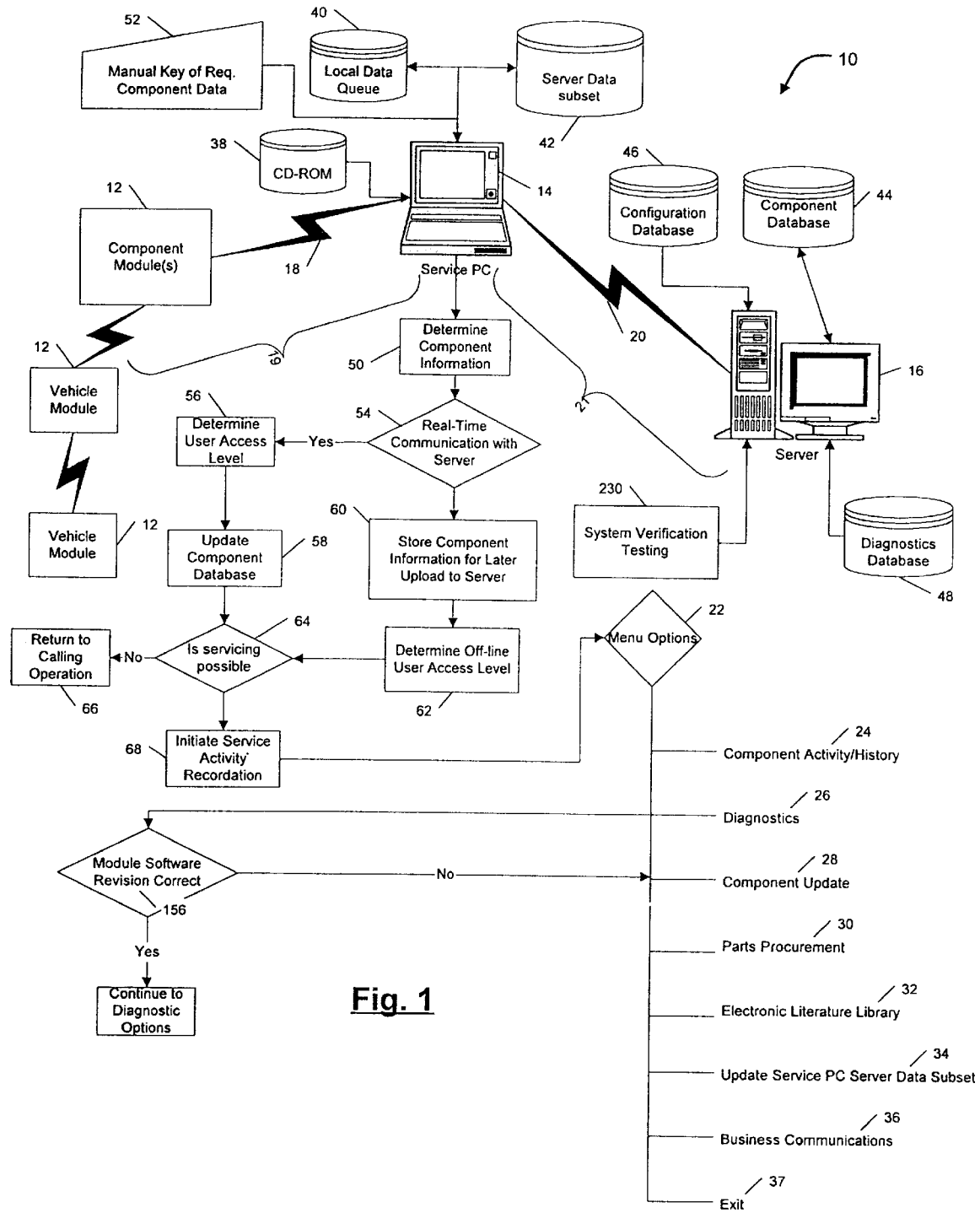
FIG. 1 is a flow chart representation of a preferred embodiment of a logistic service system according to the present invention.

A logistic service system 10 is illustrated in FIG. 1 that comprises one ore more interconnected electronic communications units or modules 12, each of which is associated with a vehicle component to be serviced or queried for information. System 10 also includes a local computer such as service PC 14, and a remote computer such as server 16. Module 12 is connected to service PC 14 by way of a vehicle data link 18 to create a service interface 19 while service PC 14 is connected to remote server 16 by way of a remote data link 20 to create a client-server interface 21 that may include either a dedicated communications link or the Internet.

System 10 is designed to provide a variety of vehicle related logistic services to field-based support personnel. For the purpose of the description that follows, system 10 is used with a vehicle transmission. However, any appropriate vehicle component may be handled in a similar manner using system 10.

As illustrated in a main menu options 22 selectable from service PC 14, available services include vehicle or component identification/history 24, diagnostics 26, component update 28, parts procurement 30, an electronic literature library 32, an update service PC server data subset 34, business communications 36, and system exit 37.

Client-server interface 21 is primarily intended for the real-time transfer of information between service PCs 14 and server 16. Thus, remote data link 20 should be as fast as possible.

Preferably, service PC 14 includes the following minimum configuration: Intel® Pentium® II processor, an operating system such as Microsoft® Windows®, 64 Megabytes of random access memory, a CD-ROM or DVD drive or the like, a modem or network interface card, 1+ gigabyte hard drive, and one RS232 communications port. The modem or network interface card is required for communication with server 16. When a high speed remote data link 20 is available, then service PC 14 generally requires only enough disk space to support a local data queue 40 and a small server data subset 42 comprising primarily a listing of the current software revision for each module 12 that it reads and possibly a copy of the most recent revision for each module model. Such an approach may be desired to minimize the need to continuously update service PC 14. Nevertheless, a relatively high speed CD-ROM or DVD drive 38 or the like is also specified in anticipation of providing at least some diagnostics or updates in those cases when remote data link 20 is slow. When data link 20 will be slow, both the hard disk drive and the CD-ROM or DVD drive media store a substantially larger server data subset 42.

In either case, when service PC 14 communicates with server 16, the server determines the status of the information within server data subset 42 and offers to update the information stored within the data subset to maintain its accuracy. When the information is not current the user is prompted to permit the downloading of updated information. However, the user also has the option to defer the download to a more convenient time. Moreover, the user can force a complete resynchronization of the available information contained within server data subset 42 and server 16 by selecting update service PC server data subset 34 from menu options 22.

Server 16 is a high-speed computer used to perform applications for client such as service PC 14, execute internal applications and to store large amounts of data. Server 16 should minimally have a standard server hardware platform, a network interface card or modem(s) adapted to connect to multiple service PCs 14 at the highest possible speeds, a CD-ROM or DVD drive or the like, and sufficient random access memory and information storage capabilities. As illustrated in FIG. 1, server 16 includes a component tracking database 44, a configuration retrieval database 46, and a diagnostics database 48.

Component tracking database 44 is used to establish user authorization, track product operation history (e.g., histograms/records of critical operating parameters or configurations and past service), and product ownership. Parameters that are saved include vehicle identifier numbers, module identification information, module software revision information, and very specific product or component configuration information and performance history. It is even possible to track part replacement issues.

Configuration retrieval database 46 is used to maintain modifications and updates available for modules 12. Diagnostics database 48 includes computer-assisted troubleshooting fault-isolation software with fault tree execution, parts descriptions, trouble shooting guides, application guidelines, illustrated parts manual, and even training materials.

To facilitate usage of the various databases and communication with service PCs 14, both service PC 14 server 16 should typically include appropriate application or client-server software to facilitate the following services. The application software required includes: (1) information delivery (e.g., ability to provide information or reports in Hypertext Marked Up Language ("HTML") format, Extensible Marker Language ("XML") format, and Adobe® Acrobat®.pdf format); (2) security (e.g., data encryption for security and integrity between server 16 and service PC 14); (3) business transaction (e.g., electronic mail, authentication and authorization information, authorized facility information, administrative contact data, the service PC administrator and the assigned users and their authorization level, and electronic commerce interfacing such as credit card purchasing and authorizing); and (5) communications (e.g., ability to transfer data packets using Hyper-Text Transfer Protocol ("HTTP")). Typically, a web browser such as Netscape® Communicator® or Microsoft® Explorer® is used by each service PC 14 in undertaking the noted services.

The user interface associated with service PC 14 is predominantly graphical in nature. Menus and list selections dominate as illustrated in the Figures. Whenever possible, information available within one portion of the system (e.g., module 12) shall be readily transferable to another portion (e.g., server 16) to avoid the need for re-keying and possible entry error. Thus, manual data entry as through a keyboard is minimized. Moreover, system 10 relies heavily on the use of prompts and cues such as time-out warnings and the like to ensure that specific tasks are properly completed.

To facilitate the service interface 19, both service PC 14 and module 12 require the appropriate hardware and software capabilities to support two-way communication via vehicle data link 18. Two-way communication is necessary to support module operation configuration changes, module operation version changes and various forms of diagnostic testing. In a preferred embodiment, both components have hardware and software available to support Serial Data Communications Between Microcomputer Systems in Heavy-Duty Vehicle Applications SAE Standard J1708, but with encryption; Joint SAE/TMC Electronic Data Interchange Between Microcomputer Systems in Heavy-Duty Vehicle Applications SAE Standard J1587; and Network Specification J1939.

The initiation of system 10 is also illustrated in FIG. 1. Service PC 14 first communicates with module(s) 12 to obtain required component or vehicle information 50 that includes any additional required information 52 either keyed by the user or retrieved directly from the local computer. Typically, information 50 includes: (1) component serial/identification number; (2) vehicle serial/identification number; (3) module revision level (application and revision); (4) current component configuration information; (5) engine control manufacturer and identification; (6) vehicle make; (7) vehicle mileage; (8) service site identification information; (8) system user identification information; and (9) current date and time.

System 10 determines at point 54 if it is possible to communicate directly with server 16. If real-time communication is possible, server 16 determines the level of user access at point 56 based on site-specific options and the system user identification information.

Logistic service system 10 envisions different levels of users with respect to service PC 14. The list of support personnel includes people from a mechanic on a shop floor to a component manufacturing expert performing advanced component servicing in the field. The user level of authority will be given per component, and by facility. When different levels of users are implemented, the menus and options available to the user are different.

A basic user has access to limited functions to allow simple diagnostics and product repair. Such a user has the ability to initiate service, retrieve and clear fault codes, undertake select isolation procedures, monitor and record data, receive service activity reports, and use help functions for the areas they are allowed to use.

An intermediate level user is more familiar with the component being serviced and will typically use more advanced diagnostic features to service a component. Therefore, an intermediate level user has all of the functions available to a basic user along with more sophisticated symptom diagnostics and the like. Moreover, an intermediate level user has increased capability to update a component including undertaking program memory updates, calibration, vocational changes and feature updates.

An advanced level user is an expert on the component being serviced and typically includes manufacturer support personnel. An advanced user has all the existing functions available for product service along with the ability to undertake substantial component configuration changes.

Next, as shown at point 58, information 50 is shared real time with server 16 to update the tracking and identification information stored regarding the specific component and vehicle in component tracking database 44. If no record has been created in database 44, a record is created.

Otherwise, if real-time communication is not possible at point 54, information 50 is stored in queue 40, as shown at point 60, for later uploading when the connection is reestablished. Then at point 62, the level of user access is determined based in part on the information available within server data subset 42. However, full access to menu options 22 is not possible.

After transmitting or storing information 50 and determining the level of user access, enough data is contained within information 50 to permit a determination if the component associated with module 12 is one that is capable of being serviced (i.e., it was built by the manufacturer) as determined at point 64. System 10 returns to the calling operation at point 66 if servicing is not possible.

If servicing is possible, then system 10 initiates recordation of all service activity associated with the service session at point 68 for later generation as a service activity report. A service activity report is a "summary" of key actions taken during a single session for diagnostic purposes. It contains a debug trail indication and includes key data that was read or entered with respect to a specific component of a vehicle. The debugging scenario selected, discussed below, the steps performed, and the values measured are also maintained in the Service Activity Report. The report is offered to the user anytime that the program receives an "exit" command and within most system menus as shown at exit point 37 under menu options 22.

Upon exiting system 10, the activity report is saved in a history file on service PC 14 and optionally uploaded in whole or in part to component tracking database 44. History files are maintained within service PC 14 for a predetermined time or until a memory limitation is detected. If history files are to be pre-maturely deleted, the oldest files shall be deleted first, typically after notifying the most recent system user.

System 10 goes from point 68 to menu options 22. The first selection available, vehicle/component activity history 24, allows a qualified user to obtain available information about a particular vehicle component from component tracking database 44. As noted above, such information includes component operation history (e.g., histograms/records of critical operating parameters or configurations and past service summaries or service activity reports), and product ownership tracking.

Figure 2:
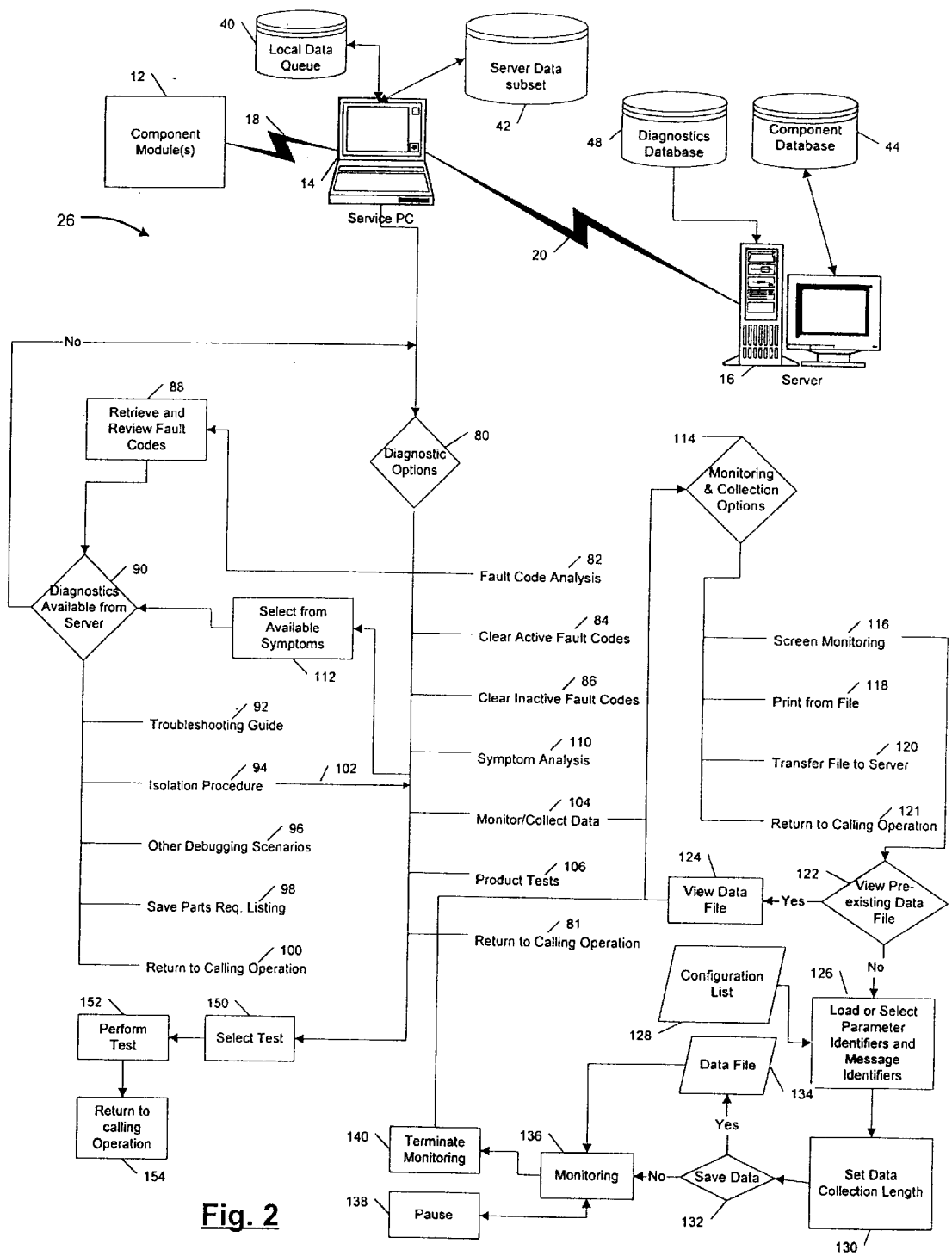
FIG. 2 is a flow chart representation of a preferred embodiment of diagnostics according to the present invention.

Diagnostics 26 are discussed in much greater detail with respect to FIG. 2. When diagnostics 26 are selected, a diagnostics option menu 80 is presented.

The first three options relate to all component failure information (i.e., fault codes) that have already been detected by the component module and/or other vehicle modules attached to module 12 while option 81 relates returning system 10 to the calling operation (e.g., menu 22). Fault code analysis 82 permits the retrieval and review of fault codes. Option 84 relates to the clearing of active fault codes, and option 86 relates to the clearing of inactive fault codes. Once the codes have been cleared, the display is updated.

If a code is unable to be cleared, that information is also provided to the user in the activity report. If the code does not related to a product supported within server 16 or server data subset 42, then the activity report is not kept, but the fault codes are cleared and the results displayed.

Active fault codes are codes that represent problems that are still being detected while inactive fault codes represent problems that are no longer being detected for one reason or another.

After selecting option 82, the user may choose to view component or vehicle fault code information at point 88. Then both active and inactive fault information is displayed. If component information is requested, only the component fault codes are displayed. If vehicle information is requested, only the vehicle fault codes are displayed. Each fault code indicates which vehicle component provided the code.

The list of codes is displayed with active codes followed by inactive codes. For both the active and inactive codes, the most recent codes are listed first. The information displayed for each code is:

MID (module identifier)

PID/SID (parameter identifier or subsystem identifier numbers)

FMI w/Description of FMI (failure mode identifier)

Flash Code number (index number combining MID, PID/SID and FMI)

Fault Name

Time Stamp (PID 254, if supplied by product)

Number of Occurrences

Description of Fault

Active or Inactive Status

Once the codes are reviewed, the user may select a specific fault code, typically combined within a flash code number having the additional information noted above for additional diagnostic follow up. Use of a flash code number, in which the fault code is embedded, as opposed to the raw fault code itself, is sometimes advantageous to refine possible diagnostic scenarios available for a particular component or vehicle.

At decision point 90 the code is compared with diagnostic information available from either server 16 or server data subset 42. If information regarding the fault code is not available, system 10 returns back to diagnostic options menu 80 after giving an error message. In a preferred embodiment of the invention, at least a portion of the service activity report may be sent to server 16 and flagged for consideration by an expert user to determine if modifications need to be made in the form of further enhancement of the troubleshooting guide/service manual or isolation procedures to address the failure to provide further diagnostics. Thus, the troubleshooting guide/service manual and isolation procedures are improved and fine-tuned over time. As discussed below, direct communication with a user is also possible after reviewing the service activity report of the failed diagnostic troubleshooting.

If a code for which diagnostics is available is selected, then various additional menu options are presented in the form of debugging scenarios including troubleshooting guide/service manual 92, isolation procedure 94, other debugging scenarios 96, save parts required listing 98, and return to diagnostic options 100. The debugging scenarios are customized based not only on the fault code, but also based on component information stored in component database 44, including historical information. Thus, a specific set of debugging scenarios can be provided to streamline the diagnostic process.

If troubleshooting guide/service manual 92 is selected, system 10 will direct the user to all portions of the available electronically stored materials that relate to the fault code. Typically, however, the user will go directly to isolation procedure 94 if a fault code has been selected since the isolation procedure is design to remedy the fault code by servicing the vehicle component as necessary. The procedure starts with the appropriate data link information request (s) between service PC 14 and module 12 by way of data link 18 and follows the isolation through to repair or replacement of a component or component system.

The isolation process allows the user to enter measured values as required for the isolation procedure. As the values are entered, the next required step of the isolation procedure, or the required repair, is automatically displayed for the user. As shown by line 102, execution of an isolation procedure may require both the monitor/collect data option 104 or product test option 106 of diagnostic option menu 80, as discussed further below. Once the isolation procedure is completed, the user has the option of saving a listing generated by the isolation procedure of any parts required to complete a repair for later ordering as shown at point 98. Then the user may return to the diagnostic options menu by way of menu option 100.

More sophisticated users, such as an intermediate user as discussed above, may choose to bypass a review of fault codes and go directly to the diagnostic option related to symptom analysis 110 directly. Selection of symptom analysis 110 provides a dialog box that allows a user to select from a list of predefined symptoms at point 112 for the current vehicle component being serviced. Typically, specific symptoms are stored on server 16 in a compressed form. They are downloaded to the service PC 14 at the start of a troubleshooting session when diagnostic options menu 80 is selected and after specific vehicle component information has been provided as discussed above. Thus, a list of available symptoms is determined from a listing of all possible symptoms based on the component information provided or already stored in component database 44. Alternatively, at least a subset of the specific symptoms may be stored as part of server data subset 42.

Once a symptom is identified, system 10 determines if diagnostics are available from server 16 or from server data subset 42 as discussed above with respect to fault codes. If diagnostics are available for the identified symptom, then troubleshooting guide/service manual 92, isolation procedure 94, other debugging scenarios 96 and save parts required listing 98 may be used as discussed with respect to a specific fault code. In the case of troubleshooting guide/service manual 92, the user is directed to portions of the guide that relate directly to the identified symptom. If diagnostics are available, the events discussed above with respect to fault codes are also available for the list of selected symptoms, and the user is then able to return back to the diagnostic options menu 80.

Another option available at menu 80 is the monitor/collect data option 104. Selection of option 104 permits a user to view all parameters available from module 12 in real time by way of data link 18 to service PC 14. There are several monitoring and collection options available as shown in menu 114. The options include screen-monitoring 116, print from file 118, transfer file to server 120, and return to calling operation 121. Thus, if monitor/collect data 104 is called directly from options menu 80, system 10 will return to the menu. If monitor/collect data 104 is called from isolation procedure 94, however, the program will return to the procedure and continue to the next step.

As noted above, monitor/collect data option 104 is often used as part of an isolation procedure 94 as noted above in response to identification of a specific fault code or symptom. Therefore, the ability to transfer a data file to server 16 as shown by option 120 or the ability to print the data file to a printer as shown at point 118 is very important. Through the use of these two options it is possible for an expert user at a remote location to consider the data. Such an approach provides additional diagnostic support to a user associated with service PC 14, particularly when a particular fault code or symptom is not available from server 16.

When a user selects screen monitoring 116, the user must decide at decision point 122 whether to review a pre-existing data file 124 and then return to options 114 or to undertake real-time data monitoring. If the decision is made to monitor a specific component, the user must load or select parameter identifiers and message identifiers at point 126. Typically, one or more predetermined configuration lists 128 already exist that may be selected or modified and saved as a new list. Alternatively, it is possible to completely select the parameter identifiers and message identifiers to be monitored and then save them as a new configuration list 128. Configuration lists may be retrieved from or saved to either the service PC 14 or server 16, depending on the user level and options specified at a particular servicing location.

More specifically, at point 126, a list of all defined J1587 parameter identifiers and message identifiers will be entered into a selection list. The display preferably includes at least 7 displayed parameters. The parameters are chosen from the selection list information. The parameters are typically displayed in natural units with the units and value displayed. The unit will be displayed in the resolution set by the parameter identifier. In the case of requesting only data, the request rate will be automatically adjusted. The user can also enter a null display or overwrite a displayed message with another MID/PID.

After the appropriate parameter identifiers and message identifiers are established, at point 130 a user may set the data collection length. It is set on the basis of either time or specific pre-selected events (e.g., shift events in the case of a transmission component). The decision to save the monitoring session to file is made at point 132. Any data file saved at point 134 is preferably initially only stored on service PC 14. Monitoring finally takes place at point 136. As shown by pause option 138, it is possible to pause real-time monitoring. If monitoring is to be paused, monitoring 136 shall only restart upon recognition of triggering on a data event. To trigger the active monitoring, the user must determine specific trigger constraint. Typically, the user can pick from a list of parameters, a list of qualifiers and request operation bounds on the trigger parameters. Triggers include parameter conditions or logical operations of parameters (e.g., gear>4 and gear<6 and interrupt off; shifts out of neutral, air pressure<60), a simple user key entry, or even a time period).

Finally, once monitoring is terminated at point 140, system 10 returns to menu 114. A new option may be selected including the option to transfer a data file 134 to server 16 as shown at point 120 and discussed above.

Product tests 106 are typically performed as part of a pre-selected isolation procedure 94 as shown by line 102. However, under some circumstances a product test may be desired without undertaking full reviews of symptoms or fault codes, particularly when confirming a transmission modification as discussed further below. When product tests 106 are selected, a user is presented a list of the available tests for the current product as shown at point 150. If part of execution of a specific isolation procedure 94, a subset of available tests will preferably be displayed that are limited those directly corresponding to the procedure.

When the user selects a test, the test is then performed at point 152. Any specific information for that test and any input that is used for the test are displayed to the user. Further, the tasks to be performed are displayed and the user is required to acknowledge completion of each task before continuing to the next one. Examples of task notification would be to insure engine is off, make sure the engine is running, make sure the transmission is shifted to neutral, and the like. Once the completion of the required tasks is acknowledged, the input to turn the selected test on and off or start the test is activated. After the test is completed, control is returned to the calling operation at point 154 for the reasons discussed above for monitor/collect data 104. Thus, control may be returned to either an isolation procedure 94 or directly to menu 80, where by way of return to calling operation 154, it returns back to menu options 22 of FIG. 1.

As shown in FIG. 1, in a preferred embodiment, diagnostics 26 are not immediately executed upon selection. Instead, as shown at decision point 156, system 10 determines if module 12 has the most recent program memory update represented by a module software revision identifier. If it does not, then the recommendation is made to execute component update 28 before continuing with diagnostics 26. If the most recent version of the module program memory is installed then diagnostics 26 continues as discussed above.

Figure 3:
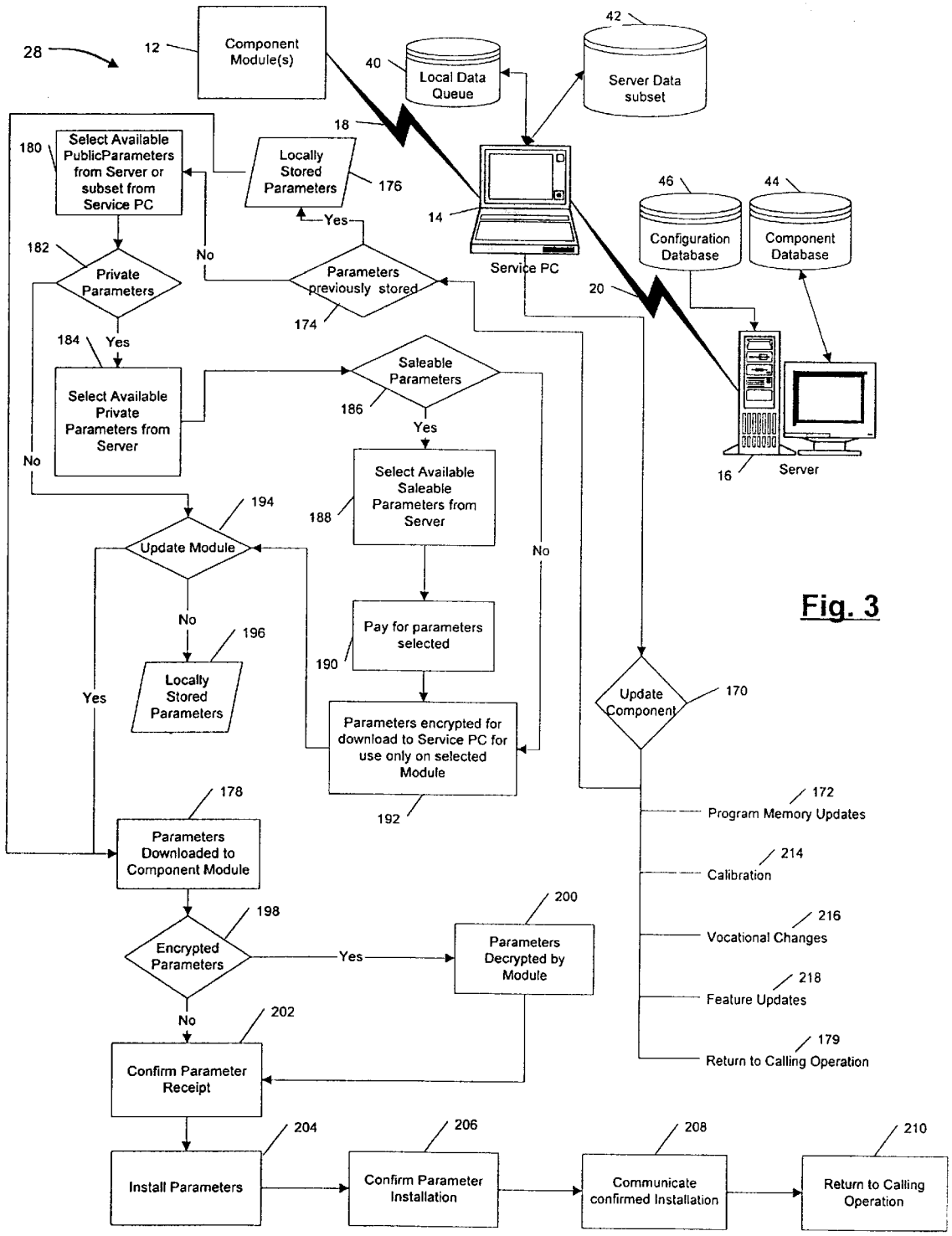
FIG. 3 is a flow chart representation of a preferred embodiment of component updating according to the present invention

What happens when component update 28 is selected from menu options 22 is discussed in more detail with respect to FIG. 3. Various component update options 170 are available, including program memory updates 172, calibrations 214, vocational changes 216, and feature updates 218. The return to calling operation option 179 is also part of update transmission options 170. If component update 28 is selected by diagnostics 26, typically only a subset of the available options such as program memory updates 172 is available for selection by a user.

Program memory updates 172 facilitates the programming of vehicle modules such as module 12 and allows a user to update the application software within a selected component to the most recent appropriate revision. When selected, system 10 first asks at decision point 174 if the desired parameters, usually in the form of application software, have been previously stored on service PC 14 as shown at point 176. It is possible to download a number of such parameter updates at one time and then install them on pre-identified modules 12. Thus, for example, if the parameters associated with a program memory update 172 have been previously saved, they may be selected at point 176 for downloading to module 12 at point 178.

If the required parameters have not already been stored on service PC 14, system 10 passes to point 180 where any available public parameters may be selected from server 16 if it is available or a subset from service PC 14. Then at decision point 182 the determination is made if there are any private parameters available. If yes, then system 10 passes to point 184 so that any available private parameters may be selected from configuration database 46. Program memory updates 172 contain at least some private parameters. Therefore, the user selects from available private parameters available from server 16 at point 184 when server 16 is available. Otherwise, unless the private parameters are stored in an appropriate secure format on in either server data subset 42 or CD-ROM 38, they are unavailable. Next, at decision point 186 system 10 determines if there are any saleable parameters available from configuration database 46 for the program memory update 172. If such parameters are available, then they may be selected at point 188 and paid for at point 190. At point 192 all of the parameters are encrypted by server 16 for download to Service PC for use only on the pre-determined module 12. The encryption shall include a unique module related identifier(s) as "seed values" for the encryption calculations. The purpose of the encryption is to prevent users from copying the download and using it on more than one module. Thus, the encryption is separate and apart from the security-based encryption and error checking discussed above between server 16 and service PC 14.

A program memory update 172 is customized by server 16 based on the specific information on the product provided by transmission database 44 with possible input from a user. The specific module number, serial number, and an application identifier are typically used to determine the most recent program memory update 172 available.

At decision point 194 the user decides if the selected parameters are to be installed to module 12 as an update. If yes, then the parameters are downloaded to the component module 12 at point 178. If downloaded, the preferred data link 18 for encrypted parameters shall be based on the "Jtalk" format, but extended to include the encryption of the data. Otherwise, the parameters are stored on service PC 14 for later installation as shown at point 196.

As shown in FIG. 3, if no private parameters are to be selected, the entire encryption process may be bypassed with system 10 going directly to decision point 194.

To enable parameter updating of module 12, the service PC 14 must send an encrypted message to the designated module to enable the download. The activity will normally require the module to run from a non-volatile section of memory and allow its parameter or program memory to be re-written, This "enable to write" shall be time limited and require a rewrite every second. Otherwise the module will go back to a protected mode.

Once downloaded to module 12, system 10 determines if the downloaded update is encrypted at decision point 198. Since the program memory update 172 is encrypted, the parameters are decrypted by module 12 as shown at point 200. Once decrypted, module 12 confirms receipt of the new parameters at point 202. If no decryption is required, module 12 immediately confirms receipt of the new parameters at point 202.

Module 12 then installs the parameters at point 204. The parameter installation is confirmed at point 206. Depending on the new parameters installed, system 10 may enter diagnostics 26 to confirms the parameter installation or otherwise reset any required calibrations or settings. Alternatively, failed or successful changes may be indicated using a mixture of audio alarms and visual indicators on either the module 12 or from service PC 14.

Once the installation is confirmed, at point 208 module 12 and service PC 14 confirm successful transmission updating with server 16. If the parameters had previously been saved on service PC 14, they are then deleted. Finally system 10 returns back to the calling operation as shown at point 210.

Re-programmable non-volatile memory of module 12 facilitates downloading of program memory. The converse, uploading of the ECU with the software uploaded from another ECU, is not allowed by the Service PC. Security prohibits the copying of code from one module to another.

Under some circumstances a new module 12 may have to be installed as part of a diagnostic procedure 26. New modules 12 are typically pre-loaded with default base code that must typically be immediately updated for proper component operation. Under most circumstances the base code is merely sufficient to permit a program memory update 172. A substantial update is required that essentially programs module 12.

Update transmission option menu 170 includes additional selections such as calibration 214, vocational changes 216, and feature updates 218. The procedure for the updating of the parameters associated with these selections is basically identical to that undertaken for program memory updates 172. However, as noted above it is possible for some of the parameter updates to lack any private parameters as noted in more detail below. Under such circumstances, the user may select the desired non-private or public parameters from server 16 or a subset thereof directly from server data subset 42 of service PC 14. Once the parameters are selected they are downloaded to module 12 without requiring encryption as discussed above.

Calibration 214, vocational changes 216 and feature updates 218 are closely related. All three provide ways of updating a module 12 according to particular preferences.

Calibration 214 addresses specific performance choices that may be available for an installed product as determined by the module identifier and application identifier of module 12. It is more module specific. With respect to a transmission, for example, one available calibration change might include torque settings. It is possible to set an overall torque limit as well as a torque limit for each gear. Similarly, it is also possible to change the number of gears used by the transmission.

"Optimization calibrations" allows the user to optimize the performance of a product according to the vehicle user's preferences within a given set of guidelines. Examples of optimization calibrations to a transmission include starting gear, shift RPM, or maximum tire pressure. These optimization calibrations are considered public calibrations.

Vocational changes 216 permit the hardware for a single transmission to be more globally modified for specific work environments such as fleet, performance, and construction. For example, the same transmission can be installed in a garbage truck and in a long distance vehicle. The vocation parameters of the transmission may be readily updated to module 12 depending on the work environment and may be changed if the work environment of the transmission changes.

Finally, feature changes 218 allow a user to turn on and off vehicle specific functions. Examples would be Power Take Off, Quick to Neutral, or Neutral Lock. These modifications are considered to be public parameters.

As noted above, system 10 has the ability to save a listing of all parts identified during a diagnostic routine 26. Under menu option 30 of menu options 22, shown in FIG. 1, the parts may be ordered and the user invoiced for the products as part of a parts procurement process. More specifically a user may determine part availability, pricing and order status as well as order parts. Ordering information includes the buyer, location, blank purchase order reference and authorization number. A tracking number is assigned for all placed orders. When a user requests order status, system 10 will provide a number of responses, including: waiting for processing, order placed, and order shipped.

The electronic literature library 32 is also an available option under the main menu options 22. There are a number of available resources if library 32 is selected. These resources include component information, procedure information, parts descriptions, application guidelines, and illustrated parts manuals. Other resources may include service bulletins, update information regarding system 10, and any operational procedural changes. To review the resources that are component specific, the desired component may be manually selected from those available. Alternatively, if appropriate component information has been retrieved from module 12, the information provided will refer to the selected component.

Component information includes information about a selected component including sales information and training information. Often the information includes a combination of audio and video presentations as opposed to strictly written materials. Procedure information provides the user with an index of the available troubleshooting guides/service manuals or isolation procedures. Finally, parts information provides the user with an index of the parts manual when selected from the opening screen. As noted above, the information is made available in standard industry formats, and is preferably compressed to facilitate downloading between server 16 and service PC 14.

Business communications 36 is another option available from menu options 22. Business communications 36 includes electronic mail and specialized file transfer capabilities to provide further assistance to a user. Electronic mail includes special transfer requests, questions, and problem situations. Moreover, business communications 36 keeps track of such things as the authorized facilities, their approved identification numbers, the administrative contact, the service PC administrator, the assigned users and their authorization levels.

System 10 also includes system verification testing 230. Such testing involves software verification and system verification of module 12, service PC 14, server 16, and both data links 18 and 20. If system 10 is not performing correctly, then functions such as diagnostics testing 26 and system update 28 are compromised. Software verification includes the following:

1. Appropriate identification information for all system components.
3. Identification of the software version being tested.
4. Identification and description of any test being performed on module 12.

The information collected includes the identification and description of each test case for each test performed on the component module including the results of each test case with any anomalies, discrepancies, or errors that occurred during the execution of the test case. Records of any information are also collected that may help isolate and correct the cause of the problems observed.

The disclosed embodiments and examples are given to illustrate the present invention. However, they are not meant to limit the scope and spirit of the present invention. Therefore, the present invention should be limited only by the appended claims.

What is claimed is:

1. A logistic service system comprising:
    a re-programmable vehicle module;
    a service computer;
    a central server;
    a first data link connecting said module to said service computer;
    a second data link connecting said service computer to said central server; and
    diagnostics, said diagnostics including
        at least one of a fault code retrieved from said component module and isolated symptoms;
        a diagnostics database on said central server; and
        a debugging scenario, said debugging scenario determined by a comparison of said at least one fault code or said symptoms with corresponding information within said diagnostics database.

2. A logistic service system as recited in claim 1, wherein said fault code is retrieved by said service computer from said module by means of said first data link; and said fault code is communicated to said server from said service computer by means of said second data link.

3. A logistic service system as recited in claim 1, further comprising:
    component information, said component information being communicated to said server;
    a list of all possible symptoms stored on said server, and
    available symptoms, said server comparing said component information with said possible symptoms to provide said available symptoms, and wherein said symptoms are selected from said available symptoms.

4. A logistic service system as recited in claim 1, wherein said debugging scenario includes an isolation procedure, said isolation procedure associated with one of said fault code and said symptoms.

5. A logistic service system as recited in claim 4, wherein said isolation procedure includes component monitoring, said component monitoring including data retrieved from said component in real-time.

6. A logistic service system as recited in claim 4, wherein said data is selectively stored on said service computer and selectively transferred to said server.

7. A logistic service system comprising:
    a re-programmable vehicle module, component information stored in said module representing information concerning said module and any components connected to said module;
    a service computer;
    a central server;
    a first data link connecting said module to said service computer, said component information transferred from said module to said service computer through said first data link;
    a second data link connecting said service computer to said central server, said component information transferred from said service computer to said server through said second link;
    a component database stored on said server, said component database being updated with a sub-set of said component information; and
    diagnostics, said diagnostics including
        fault codes associated with said component information, at least one of said fault codes being transferred to said server,
        a diagnostics database on said server,
        a debugging scenario, said debugging scenario determined by a comparison of said fault code with a corresponding fault code in said diagnostics database, and
        symptom analysis, a list of all possible symptoms being compared to said component information to generate a list of all available symptoms, diagnostic symptoms being manually selected from a listing of all said available symptoms.

8. A logistic service system as recited in claim 7, wherein said diagnostics include component monitoring, said component monitoring including data retrieved from said component in real-time.

9. A logistic service system as recited in claim 7, wherein said system includes component module updating, wherein said module updating includes parameters, said parameters including at least one of public parameters and private parameters, said parameters representing at least a sub-set of all available parameters, said available parameters generated by a comparison of said component information and a listing of all possible parameters, said parameters used to update said module, said module confirming said update.

10. A logistic service system as recited in claim 9, wherein said parameters include encrypted parameters, said encrypted parameters based in part on said component information so that they can only be decrypted by said module generated said component information.

11. A logistic service system as recited in claim 10, further including service activity recordation, said recordation tracking steps taken by said system in servicing said module and providing a resource for later diagnostics of said module.

12. A logistic service system as recited in claim 10, including various levels of user access to said system, said levels corresponding to options available for said diagnostics and said component module updating.

13. A logistic service system as recited in claim 7, wherein said component database includes both present and past component information, said present and past component information being used to customize servicing of said module, including providing a customized debugging scenario or a customized listing of available parameters for download as part of a component update.

14. A logistic service system comprising:
    a re-programmable vehicle module;
    a service computer;
    a central server;
    a first data link connecting said module to said service computer;
    a second data link connecting said service computer to said central server; and including various levels of user access to said system, determination of said access stored on said server.

15. A logistic service system comprising:
    a re-programmable vehicle module;
    a service compute;
    a central server;
    a first data link connecting said module to said service computer;
    a second data link connecting said service computer to said central server; and further including service activity recordation, said recordation tracking steps taken by said system in servicing said module, and providing a resource for later diagnostics of said module.

16. A logistic service system comprising:
a re-programmable vehicle module;
a service computer;
a central server;
a first data link connecting said module to said service computer,
a second data link connecting said service computer to said central server; and further including component module updating, said module updating comprising at least one of public parameters and private parameters, said parameters representing a sub-set of all available parameters.

17. A logistic service system as recited in claim 16, further comprising:
component information, said component information being communicated to said server; and
a list of all possible parameters stored on said server, said server comparing said component information with said possible parameters to provide a listing of said available parameters, said parameters being selected from said available parameters.

18. A logistic service system as recited in claim 17, wherein said parameters are used to update said module, said module confirming said update and said service computer transmitting updated component information to said configuration database of said server.

19. A logistic service system as recited in claim 17, including encrypted parameters, said encrypted parameters relying in part on said component information to permit decryption only by said module to the exclusion of all other modules.

20. A logistic service system as recited in claim 19, wherein said parameters are only encrypted when said parameters include at least one of said private parameters.

21. A logistic service system as recited in claim 20, said parameters further including a saleable parameter, said saleable parameter being a private parameter associated with the payment of a fee.

22. A logistic service system comprising:
a re-programmable vehicle module, component information stored in said module representing information concerning said module and any components connected to said module;
a service computer;
a central server;
a first data link connecting said module to said service computer, said component information transferred from said module to said service computer through said first data link;
a second data link connecting said service computer to said central server, said component information transferred from said service computer to said server through said second link; and
a component database stored on said server, said component database being updated with at least a sub-set of said component information, said server storing said sub-set of said component information specifically for said module, permitting future analysis of said sub-set of said component information in connection with an analysis of said module, and wherein said component database includes both present and past component information, said present and past component information being used to customize servicing of said module.

23. A logistic service system as recited in claim 22, wherein present and past component information provides a customized debugging scenario or a customized listing of available parameters for download as part of a component update.

24. A logistic service system comprising:
a re-programmable vehicle module, component information stored in said module representing information concerning said module and any components connected to said module;
a service computer;
a central server;
a first data link connecting said module to said service computer, said component information transferred from said module to said service computer through said first data link;
a second data link connecting said service computer to said central server, said component information transferred from said service computer to said server through said second link;
a component database stored on said server, said component database being updated with at least a sub-set of said component information, said server storing said sub-set of said component information specifically for said module, permitting future analysis of said sub-set of said component information in connection with an analysis of said module;
fault codes associated with said component information, at least one of said fault codes being transferred to said server;
a diagnostics database on said server;
a debugging scenario, said debugging scenario determined by a comparison of said fault code with a corresponding fault code in said diagnostics database.

25. A logistic service system comprising:
a re-programmable vehicle module, component information stored in said module representing information concerning said module and any components connected to said module;
a service computer;
a central server;
a first data link connecting said module to said service computer, said component information transferred from said module to said service computer through said first data link;
a second data link connecting said service computer to said central server, said component information transferred from said service computer to said server through said second link;
a component database stored on said server, said component database being updated with at least a sub-set of said component information, said server storing said sub-set of said component information specifically for said module, permitting future analysis of said sub-set of said component information in connection with an analysis of said module, and
further comprising symptom analysis, a list of all possible symptoms being compared to said component information to generate a list of all available symptoms, diagnostic symptoms being manually selected from a listing of all said available symptoms.

26. A logistic service system comprising:
a re-programmable vehicle module, component information stored in said module representing information concerning said module and any components connected to said module;

a service computer;

a central server;

a first data link connecting said module to said service computer, said component information transferred from said module to said service computer through said first data link;

a second data link connecting said service computer to said central server, said component information transferred from said service computer to said server through said second link;

a component database stored on said server, said component database being updated with at least a sub-set of said component information, said server storing said sub-set of said component information specifically for said module, permitting future analysis of said sub-set of said component information in connection with an analysis of said module; and wherein said system includes component module updating, said module updating having parameters, said parameters including at least one of public parameters and private parameters, said parameters representing at least a sub-set of all available parameters, said available parameters generated by a comparison of said component information and a listing of all possible parameters, said parameters used to update said module, and said module confirming said update.

27. A logistic service system as recited in claim 26, wherein said parameters include encrypted parameters, said encrypted parameters based in part on said component information so that they can only be decrypted by said module generated said component information.

* * * * *

UNITED STATES PATENT AND TRADEMARK OFFICE
CERTIFICATE OF CORRECTION

PATENT NO. : 6,434,455 B1
DATED : August 13, 2002
INVENTOR(S) : Kevin D. Show et al.

It is certified that error appears in the above-identified patent and that said Letters Patent is hereby corrected as shown below:

Column 13,
Line 29, replace "on said server," with -- on said server; --.

Column 14,
Line 31, replace "servicing said module" with -- servicing said module, --.
Line 59, replace "a service compute;" with -- a service computer; --.

Column 15,
Line 6, replace "computer," with -- computer; --.

Column 16,
Line 57, replace "said module, and" with -- said module; and --.

Signed and Sealed this

Tenth Day of December, 2002

JAMES E. ROGAN
*Director of the United States Patent and Trademark Office*